United States Patent [19]

Allison et al.

[11] Patent Number: 4,489,427
[45] Date of Patent: Dec. 18, 1984

[54] BITEWING HOLDER

[75] Inventors: Kenneth L. Allison, Claremont; Helio Gomez, So. Pasadena; Robert Manchego, Azusa, all of Calif.

[73] Assignee: Xerox Corporation, Stamford, Conn.

[21] Appl. No.: 561,151

[22] Filed: Dec. 15, 1983

Related U.S. Application Data

[63] Continuation of Ser. No. 465,990, Feb. 14, 1983, abandoned.

[51] Int. Cl.³ .............................................. G03B 41/16
[52] U.S. Cl. .................................... 378/170; 378/168
[58] Field of Search ........................ 378/168, 169, 170

[56] References Cited

U.S. PATENT DOCUMENTS 1,706,117  3/1929  Heckel .
2,005,993  6/1935  Heron ................................. 378/170
2,075,491  3/1937  Wilson .
2,240,336  4/1941  Kreider .
3,356,845  12/1967  Bergendal ........................... 378/168
3,936,643  2/1976  Toner ................................ 378/168
4,075,494  2/1978  Jermyn ............................... 378/170
4,251,732  2/1981  Fried .

Primary Examiner—Craig E. Church
Attorney, Agent, or Firm—Robert E. Cunha

[57] ABSTRACT

A plastic bite holder for securely holding a rigid cassette comprising a photoreceptor and a light proof cover for use as a dental x-ray imaging medium is described. The holder is molded into a single piece of polyethylene and has a tab onto which the patient bites, a backing plate and two gripping members for securely holding the cassette against the backing plate.

1 Claim, 2 Drawing Figures

BITEWING HOLDER

This is a continuation of application Ser. No. 465,990, filed Feb. 14, 1983 abandoned.

In the typical dental office procedure, x-ray images of the mouth are taken using dental x-ray film manufactured by Kodak. For the back teeth, the film is typically held in place during exposure time by a cardboard bite holder manufactured by Green Dental Products which has a loop section into which the film fits, and a bite tab section which the patient bites onto.

There are several disadvantages to this system. The development of the film is inconvenient and time consuming, and the film and holder must be discarded after one use. Also, the cardboard holder does not rigidly hold the film in position.

In a more recently developed system, the film is replaced by a xeroradiographic photoreceptor plate which is charged to between 2,000 and 4,000 volts prior to use, and is then discharged to form a dental image in the usual way by exposure to x-rays. To prevent discharge by ambient light, the plate is fitted with a light-proof cover to form a cassette, and to prevent cross contamination by the transfer of saliva between patients, the cassette is enclosed in a plastic disposable sanitary bag with an adhesive closure during the time it is in the patient's mouth. The advantages of this system are lower cost because the plates are reusable, require $\frac{2}{3}$ less x-ray dosage and greater convenience because the plates are developed automatically.

A structural difference is that the casette is rigid, as compared to the flexible construction of typical x-ray film. Therefore, while this casette could be held in position in the mouth of the patient by a typical cardboard holder, it has been found to be advantageous for two reasons to provide a plastic holder instead, the holder comprising a backing plate and gripping members for securely holding the cassette, and a tab onto which the patient bites. The two advantages are lower cost because the holder is reusable, and more reliable detail in the x-ray images because the fairly rigid plastic holder results in less movement of the cassette during exposure.

This invention can be discussed in more detail with reference to the following drawings.

Figure 1:
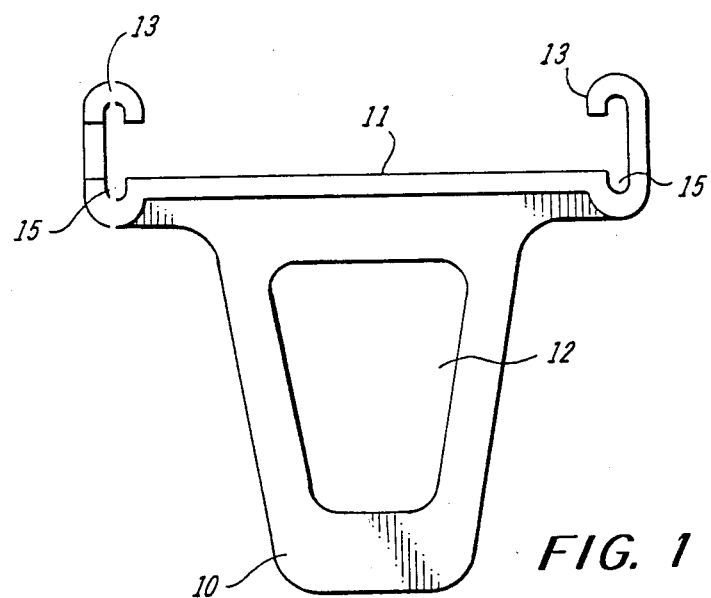
FIG. 1 is a front view of the holder.
Figure 2:
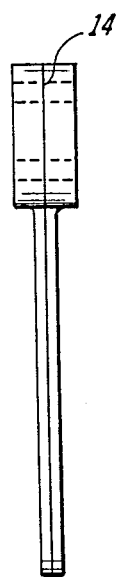
FIG. 2 is a side view of the holder.

The holder of FIGS. 1 and 2 are used in conjunction with a rigid cassette with a length and width of approximately 1 9/16×1 3/16 inches. The thickness of the cassette of approximately 170–180 thousandths compares with 40–50 thousandths for film. The dental xeroradiograph can be taken by the dental assistant in the bitewing intra oral position.

In order to properly image the bitewing xeroradiograph, this holder has been designed to hold the cassette in position so that the central x-ray beam is perpendicular to the plate. Unlike film which is pliable and conforms easily to the intra oral cavity configuration, the stiff cassette must be rigidly held without intra oral support.

The necessary characteristics of the holder are as follows. It should hold the cassette rigidly preventing movement during exposure; the plastic should not be reproduced in the x-ray process; the plastic may be autoclavable or cold sterilized; it should be comfortable for the patient; excess force should not be required to insert the cassette; the cassette should not slip in the holder during exposure; and the plastic must be FDA approved.

The holder of FIGS. 1 and 2 satisfies these requirements. The holder is manufactured from clear flexible, FDA approved polyethelene. The backing plate 11 is rigid enough to hold the cassette firmly; the tab 10 is thin enough so that there is minimum space between occlusal surfaces of upper and lower molars during exposure; and the plastic is rigid enough to last for at least five hundred exposures and sterilizations. The tab also incorporates a bite window which assures close contact of upper and lower teeth during exposure.

The plastic of choice is polyethelene, a thermoplastic. This material flows well during the injection molding process, is resilient, will spring back to its original shape when released, and can be machined if necessary. Polycarbonate and thermoset plastics are not as usable because they are harder than the preferred polyethelene.

A relative disadvantage of plastic to cardboard holders is that cardboard is more flexible, allowing closer upper and lower bite during exposure. To compensate, a hole 12 has been provided in the tab 10 to allow better meshing of the teeth. The reduction in the amount of material also lessens the impact of the material on the x-ray image and the better contact of upper and lower teeth assures maximum imaging.

The gripping members 13 at each end of the backing plate 11 are shaped as shown to enable a flexible snapping action. In FIG. 1, the plane of the cassette after insertion would be perpendicular to the page. The insertion process is to first place one edge of the cassette into engagement with one gripping member 13, and then, pushing down, snapping the other end of the cassette into place. As an alternative, the cassette could be inserted by initially placing both edges of the cassette in engagement with the gripping members 13 and then sliding the cassette into a centered position, but this is the less desirable method because it would be more likely to tear the protective plastic bag which encloses the cassette during use.

In the preferred embodiment, the distance between gripping members 13 is about five thousandths less than the thickness of the cassette to ensure an interference, or press, fit. Also, a taper outward from the center line 14 of FIG. 2 of about one half degree or one thousandths of an inch was found to aid in releasing the material from the mold.

The thickness of the backing plate 11 and the gripping members 13 is uniform along their entire length, as shown in FIG. 1. The absence of a relatively thicker section ensures that the cooling cycle in the molding process will be accomplished fairly quickly. This thickness is about sixty thousandths of an inch in this described embodiment.

The gap 15 between each gripping member 13 and the backing plate 11 enables a greater flexibility to aid in the snapping-in of the cassette.

While the invention has been described with reference to specific embodiments, it will be understood by those skilled in the art that various changes will be made and equivalents may be substituted for elements thereof without departing from the true spirit and scope of the invention. In addition, many modifications may be made without departing from the essential teachings of the invention.

We claim:

1. A plastic holder for a rigid bitewing x-ray photoreceptor cassette, the cassette enclosed in a plastic bag, comprising
    a single unit of plastic formed into a relatively thick rigid backing plate, a relatively thin flexible tab and two gripping members,
    said tab being attached along the length of one side of said backing plate with the center line of said backing plate lying in the plane of said tab, said tab having its central portion removed to allow a closer masking of the teeth and to minimize x-ray interference,
    a gripping member attached to each end of said backing plate and positioned to grip one edge of the cassette to hold the cassette against the backing plate in a position perpendicular to the plane of said tab and with the length of the backing plate in parallel with the plane of the cassette,
    said gripping members being slightly flexible and having surfaces oppposite said backing plate sloping toward said backing plate so that a cassette edge pressed against said sloping surfaces will snap into contact with said backing plate in a position perpendicular to the plane of said tab and with the length of the backing plate in parallel with the plane of the cassette without tearing said plastic bag, and
    wherein said backing plate has sections of reduced thickness at the points of attachment of said gripping members to allow said gripping members to be flexible at those points.

* * * * *